(12) United States Patent
Lee et al.

(10) Patent No.: US 10,037,543 B2
(45) Date of Patent: Jul. 31, 2018

(54) ESTIMATING CONVERSION RATE IN DISPLAY ADVERTISING FROM PAST PERFORMANCE DATA

(75) Inventors: Kuang-Chih Lee, Union City, CA (US); Burkay Birant Orten, Belmont, CA (US); Ali Dasdan, San Jose, CA (US); Wentong Li, Saratoga, CA (US)

(73) Assignee: Amobee, Inc., Redwood City, CA (US)

( * ) Notice: Subject to any disclaimer, the term of this patent is extended or adjusted under 35 U.S.C. 154(b) by 622 days.

(21) Appl. No.: 13/584,545

(22) Filed: Aug. 13, 2012

(65) Prior Publication Data

US 2014/0046754 A1 Feb. 13, 2014

(51) Int. Cl.
*G06Q 30/00* (2012.01)
*G06Q 30/02* (2012.01)

(52) U.S. Cl.
CPC ..... *G06Q 30/0242* (2013.01); *G06Q 30/0243* (2013.01); *G06Q 30/0254* (2013.01)

(58) Field of Classification Search
USPC .......... 705/14.71, 14.41, 14.73, 14.4, 14.45, 705/14.46, 14.54, 14.69; 706/12; 707/E17.001, E17.046, 738, 740, 741, 707/999.003
See application file for complete search history.

(56) References Cited

U.S. PATENT DOCUMENTS

| | | | | |
|---|---|---|---|---|
| 5,948,061 A | * | 9/1999 | Merriman | G06Q 30/02 705/14.53 |
| 7,130,808 B1 | * | 10/2006 | Ranka | G06Q 10/06315 705/14.43 |
| 7,257,546 B2 | * | 8/2007 | Ebrahimi | G06Q 30/02 705/14.73 |
| 7,406,434 B1 | * | 7/2008 | Chang | G06Q 10/06375 705/14.1 |
| 7,908,238 B1 | * | 3/2011 | Nolet et al. | 706/52 |
| 7,996,521 B2 | * | 8/2011 | Chamberlain | G06Q 30/0201 705/14.49 |
| 8,949,250 B1 | * | 2/2015 | Garg | G06F 17/3053 707/748 |

(Continued)

OTHER PUBLICATIONS

Agarwal, Deepak et al., "Estimating Rates of Rare Events with Multiple Hierarchies through Scalable Log-linear Models", KDD'10, Jul. 25-28, 2010, Washington, DC, USA. Copyright 2010 ACM 978-1-4503-0055-Jan. 10, 2007, Jul. 2010, 10 pgs.

(Continued)

*Primary Examiner* — Luis A Brown
(74) *Attorney, Agent, or Firm* — Kwan & Olynick LLP

(57) ABSTRACT

Embodiments of the invention present an approach to conversion rate estimation which relies on using past performance observations along user, publisher, and advertiser data hierarchies. More specifically, embodiments of the invention model the conversion event at different select hierarchical levels with separate binomial distributions and estimate the distribution parameters individually. It is shown how to combine these individual estimators using logistic regression to identify conversion events accurately. Embodiments of the invention can also handle many practical issues, such as data imbalance, missing data, and output probability calibration, which render this estimation problem more difficult for a real-world implementation of the approach.

16 Claims, 5 Drawing Sheets

(56) References Cited

U.S. PATENT DOCUMENTS

| | | | | |
|---|---|---|---|---|
| 2002/0004733 A1* | 1/2002 | Addante | G06Q 30/02 | 705/14.51 |
| 2002/0072965 A1* | 6/2002 | Merriman | G06Q 30/02 | 705/14.49 |
| 2003/0105681 A1* | 6/2003 | Oddo | G06Q 30/02 | 705/26.62 |
| 2005/0222987 A1* | 10/2005 | Vadon | G06F 17/30864 | |
| 2005/0235030 A1* | 10/2005 | Lauckhart | G06F 17/30864 | 709/200 |
| 2005/0240557 A1* | 10/2005 | Rorex | G06F 17/30864 | |
| 2005/0273440 A1* | 12/2005 | Ching | G06Q 20/20 | 705/64 |
| 2007/0038516 A1* | 2/2007 | Apple | G06O 30/02 | 705/14.42 |
| 2007/0073585 A1* | 3/2007 | Apple | G06O 30/02 | 705/14.46 |
| 2007/0129999 A1* | 6/2007 | Zhou | G06O 30/0248 | 705/14.47 |
| 2007/0244746 A1* | 10/2007 | Issen | G06Q 30/02 | 705/14.53 |
| 2007/0288394 A1* | 12/2007 | Carrott | G06F 21/10 | 705/78 |
| 2008/0033790 A1* | 2/2008 | Nickerson | G06Q 30/02 | 705/7.32 |
| 2008/0320119 A1* | 12/2008 | Achan | H04L 29/12783 | 709/222 |
| 2009/0125444 A1* | 5/2009 | Cochran | G06Q 30/0185 | 705/50 |
| 2010/0049602 A1* | 2/2010 | Softky | G06Q 30/00 | 705/14.45 |
| 2010/0161492 A1* | 6/2010 | Harvey | G06Q 10/0639 | 705/50 |
| 2010/0313009 A1* | 12/2010 | Combet | G06Q 30/0204 | 713/150 |
| 2011/0029376 A1* | 2/2011 | Mills | G06F 17/30539 | 705/14.43 |
| 2011/0173089 A1* | 7/2011 | Tan | G06F 21/10 | 705/26.7 |
| 2011/0225037 A1* | 9/2011 | Tunca | G06Q 30/02 | 705/14.46 |
| 2012/0030037 A1* | 2/2012 | Carriero | G06Q 30/02 | 705/14.73 |
| 2012/0041816 A1* | 2/2012 | Buchalter | | 705/14.41 |
| 2012/0078706 A1* | 3/2012 | Rajagopalan | G06Q 30/0242 | 705/14.41 |
| 2013/0066786 A1* | 3/2013 | Joyce | G06Q 20/12 | 705/71 |
| 2013/0212108 A1* | 8/2013 | Armon-Kest et al. | | 707/740 |
| 2013/0246173 A1* | 9/2013 | Berkley et al. | | 705/14.53 |

OTHER PUBLICATIONS

Rosales, Romer et al., "Post-Click Conversion Modeling and Analysis for Non-Guaranteed Delivery Display Advertising", WSDM'12, Feb. 8-12, 2012, Seattle, Washington, USA. Copyright 2012 ACM 978-1-4503-0747-May 12, 2002, Feb. 2012, 10 pgs.

* cited by examiner

ESTIMATING CONVERSION RATE IN DISPLAY ADVERTISING FROM PAST PERFORMANCE DATA

BACKGROUND OF THE INVENTION

Technical Field

The invention relates to display advertising. More particularly, the invention relates to estimating conversion rate in display advertising from past performance observations along selected data hierarchies.

Description of the Background Art

In the online display advertising world, advertisers try to market their product to many users by embedding their graphical advertisement within the content in publisher Web pages, e.g. the pages of news portals. The advertiser's main goal is to reach the most receptive online audience in the right context, which then engages with their displayed ad and eventually takes a desired action, identified by the type of the campaign, e.g. brand advertising or direct product marketing. The complexity of realizing this goal is so high that advertisers need specialized technology solutions called demand-side platforms (DSP).

DSPs help manage such display advertising campaigns for many different advertisers simultaneously across multiple direct buy markets or ad exchanges, where ad impressions can be acquired through real-time auctions or bidding. In a direct buy market, the impression price is decided in advance according to the business negotiations between publishers and advertisers directly. On the other hand, in a real-time ad exchange, a bid has to be submitted for each impression (submitted via ad calls) by DSPs and the impression is sold to the highest bidder in a public auction. DSPs are the platforms where all the information about users, pages, ads, and campaign constraints come together to make the best decision for advertisers.

Advertisers seek the optimal price to bid for each ad call to maximize their campaign performance. The optimal bid price of an ad impression depends on the value of that impression to a given advertiser. This value is provided to DSPs as a campaign performance parameter in the form of cost-per-click (CPC) or cost-per-action (CPA) goals. If a CPC or CPA goal is set up, then the optimal bid price can be determined from the expected cost-per-impression, which is equal to the click-through-rate (CTR) for this impression multiplied by the CPC goal, or the conversion rate (CVR) multiplied by the CPA goal.

In this scenario, campaign performance directly depends on how well the CTR or CVR can be estimated and the performance optimization can be considered as the problem of accurately estimating CTR or CVR. If these quantities are overestimated, bid prices are always higher than what they should be, the advertiser wastes campaign budget on useless impressions; on the other hand, if these quantities are underestimated, the advertiser misses high-value impressions that may have led to actions and the campaign under delivers.

The CTR and the CVR are directly related to the intention of the user interacting with the ad in a given context and they are fundamentally difficult to model directly and predict. In practice, CVR is even harder to estimate than CTR because conversion events are very rare. Also, the view-through conversions have longer delays in the logging process (sometimes up to a week), which makes the off-line modeling more difficult. Finally, the ad serving system needs to perform in real-time, requiring the CVR or CTR estimation, optimal bid price calculation, and bid submission to exchanges to be completed in a few milliseconds.

SUMMARY OF THE INVENTION

Embodiments of the invention present a simple but effective approach to estimating CVR of ad impressions to be used in a DSP. The herein disclosed conversion rate estimation method models the conversion event at different select levels of the cross-product of user, publisher, and advertiser data hierarchies with separate binomial distributions and estimates the distribution parameters individually. These individual estimators can be combined using a non-linear function learned by regression techniques to obtain a final estimate that can more accurately predict the conversion outcome for each impression.

DETAILED DESCRIPTION OF THE INVENTION

In targeted display advertising, the goal is to identify the best opportunities to display a banner ad to an online user who is most likely to take a desired action such as purchasing a product or signing up for a newsletter. Finding the best ad impression, i.e. the opportunity to show an ad to a user, requires the ability to estimate the probability that the user who sees the ad on his browser takes an action, i.e. the user converts. However, conversion probability estimation is a challenging task because there is extreme data sparsity across different data dimensions and the conversion event occurs rarely.

Embodiments of the invention present an approach to conversion rate estimation which relies on using past performance observations along user, publisher, and advertiser data hierarchies. More specifically, embodiments of the invention model the conversion event at different select hierarchical levels with separate binomial distributions and estimate the distribution parameters individually. It is shown how to combine these individual estimators using logistic regression to identify conversion events accurately. Embodiments of the invention can also handle many practical issues, such as data imbalance, missing data, and output probability calibration, which render this estimation problem more difficult for a real-world implementation of the approach. Results from real advertising campaigns are provided to demonstrate the effectiveness of the herein disclosed approach.

Overview of Ad Call Flow

Figure 1:
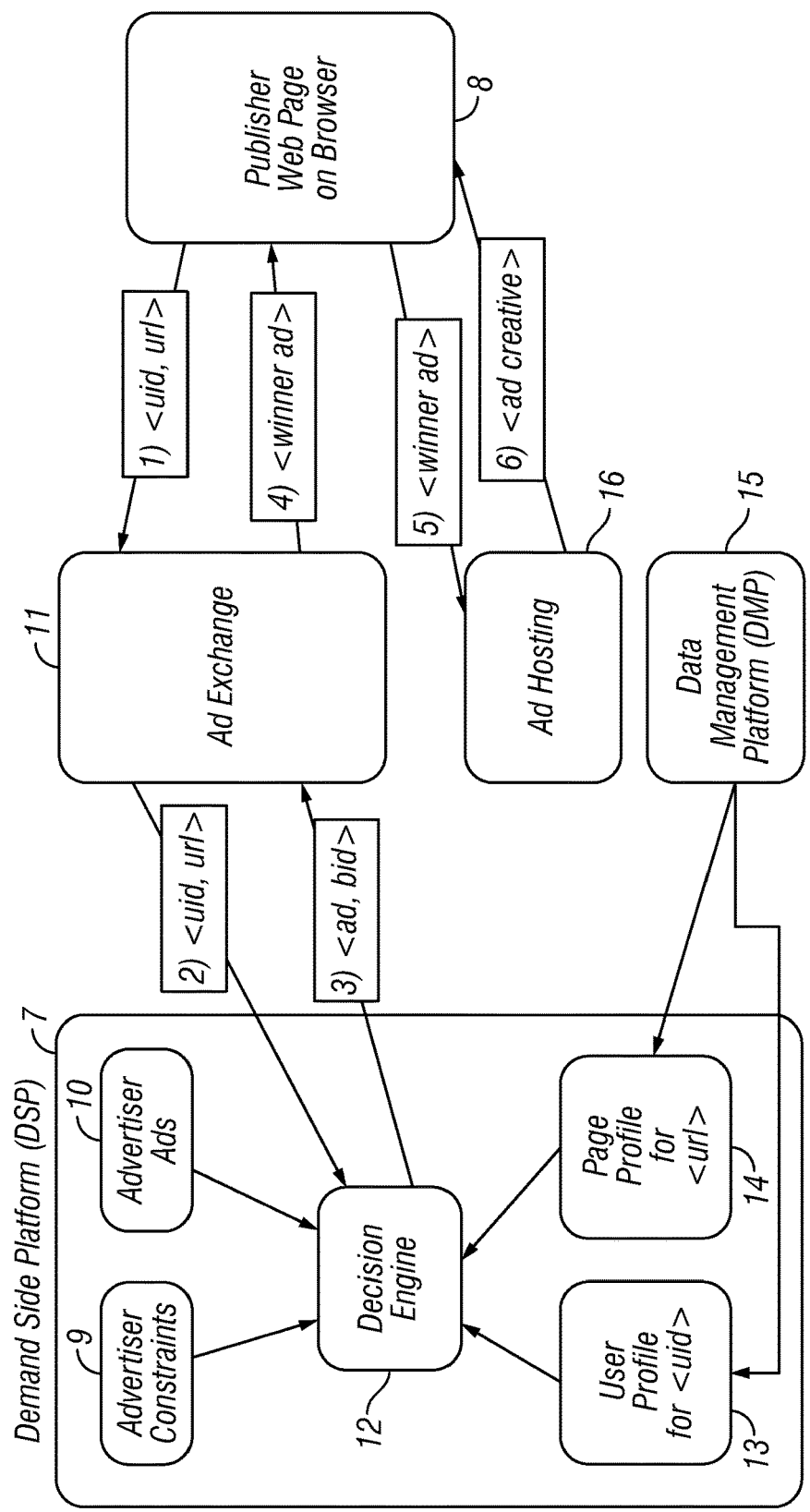
FIG. 1 is a block schematic diagram showing ad call flow between a Web browser and a demand side platform (DSP) according to the invention.

FIG. 1 is a block schematic diagram showing ad call flow between a Web browser and a demand side platform (DSP), the place where all information is collected to make the optimal decision, where the DSP receives real time ad call information and submits the bid price to participate in the auction hosted by an ad exchange, where the DSP also retrieves aggregated user data provided by a data management platform (DMP), and where an ad hosting service selects the winner ad and provides the creative to be shown on the publisher's Web page. FIG. 1 illustrates the entire ad serving pipeline between a Web browser 8 and a demand side platform (DSP) 7. Given a user with a profile 13 indexed by <uid>, a page profile 14, and campaigns from various advertisers (where a campaign include some constraints 9 and ads 10), the goal (sometimes called the fundamental problem of computational advertising) is to find the best ad under constraints for the user and the page. The mechanics of how this is done is explained next with the help of numbered steps in FIG. 1.

At operation 1 in FIG. 1, the call is initiated when a user with id <uid>starts to open a Web page at URL <url>. The call first reaches the ad exchange with which the publisher is integrated.

At operation 2 in FIG. 1, the ad exchange 11 appends <uid>and <url>to a request that it sends to its DSP partners to ask for an ad and a bid. The request usually contains other information, such as geographical location for targeting purposes. The partner DSPs may or may not respond to the request; those that respond (bidding DSPs) need to use <uid>and <url>to gather more information about the user and the page, respectively. Information about users and pages is usually provided via data management platforms (DMP) 15. The bidding DSPs also search through their repository of previously created campaigns to find a set of candidate ads that can be targeted to the user and the page. A key aspect of the invention is the provision of a decision engine 12 that selects the best ad from the candidate ads and computes the corresponding bid.

At operation 3 in FIG. 1, the bidding DSPs return back their proposed ad and bid pair back to the ad exchange 11.

At operation 4 in FIG. 1, once the ad exchange collects all the bids, it runs an auction, usually a second price auction, and determines the winning bid and the corresponding ad.

At operation 5 in FIG. 1, it then passes the winning ad and the location of its creative at the ad hosting service 16 back to the browser.

At operation 6 in FIG. 1, the browser then collects the creative and finally returns the page to the user.

Note that this entire flow must happen within one-tenth of a second so that the user can see the page with ads as soon as the user opens the page on his Web browser. Moreover, the top DSPs can get such ad calls as many as 500,000 times per second as 100s of millions of users open pages on their browsers at any given instant. This latency and throughput constraints put extreme time constraints on each bidding DSP and their decision engines. The proposed approach works under such time constraints and performs well.

Problem Setup and Formulation

As discussed above, an ad call request is sent along with the user and publisher information. Let $$U=\{u_1, u_2, \ldots, u_l\}, P=\{p_1, p_2, \ldots, p_m\} \text{ and } A=\{a_1, a_2, \ldots, a_n\}$$

represent all the users, publisher Web pages, and ads (with creatives) in a DSP, respectively. For simplicity, an ad call request to a DSP can be considered to arrive in the form adrequest={user: $u_i$, page: $p_j$}. The goal is to find the ad among all n ads that has the highest probability of conversion. Mathematically, this can be written as:

$$ad^* = \underset{k=1,\ldots,n}{\operatorname{argmax}} p(\text{conversion} | \text{user} = u_i, \text{page} = p_j, \text{ad} = a_k) \quad (1)$$

where ad* denotes the optimal ad, i.e. the ad with the highest CVR. Note that at a single user level, an event has only two possible outcomes: conversion or no conversion. Then, we can see that a conversion event can be modeled as a Bernoulli random variable. Let $$Y_{ijk} \in \{0, 1\}$$

represent the random outcome of the event, when the user $u_i$ is shown ad $a_k$ on site $p_j$. Then, we can compactly write:

$$Y_{ijk} \sim \text{Bernoulli}(p_{ijk}), p_{ijk} = p(Y=1 | u_i, p_j, a_k). \quad (2)$$

and with this new representation, equation (1) becomes:

$$ad^* = \underset{k=1,\ldots,n}{\operatorname{argmax}} p(Y = 1 | u_i, p_j, a_k) \quad (3)$$

One way of modeling the conversion event outcome is to represent the user, publisher, and advertisement using a set of explicit features and build a classification model. Examples of this approach in the sponsored search advertising context can be found (see T. Graepel, J. Q. Candela, T. Borchert, and R. Herbrich, *Web-scale Bayesian click-through rate prediction for sponsored search advertising in Microsoft's bing search engine*, International Conf. on Machine Learning, 2010; and M. Richardson, E. Dominowska, and R. Ragno, *Predicting clicks: estimating the click-through rate for new ads*, WWW, pages 521-530, 2007).

Because low-level data features are poorly correlated with a user's direct intention of taking an action on a display ad, models that are based on these features perform poorly in our context. An alternative idea is to compute the number of times this ad was displayed to similar users on this Website and observe how many of these impressions result in a conversion. Then, the conversion rate for this user can be estimated as the total number of conversions among all similar users divided by the total number of impressions. Note that this is nothing but the maximum likelihood estimate (MLE) of the conversion rate and can be written as follows:

$$\tilde{Y}_{ijk} \sim \text{Binomial}(T_{ijk}, \tilde{p}_{ijk}), \quad (4)$$

$$\tilde{p}_{ijk} = p(Y = 1 | u \in \text{UsrClust}_i, p_j, a_k),$$

$$\tilde{p}_{ijk}^{MLE} = \begin{cases} \dfrac{S_{ijk}}{T_{ijk}}, & \text{if } T_{ijk} \neq 0 \\ \text{unknown}, & \text{if } T_{ijk} = 0, \end{cases}$$

where $T_{ijk}$ denotes the number of trials, i.e. impressions, and $S_{ijk}$ denotes the number of successes, i.e. conversions, when ad $a_k$ was shown to users from u∈UsrClust$_i$ on Website $p_j$. It is important to point out that in equation (4), i does not index the particular user whose conversion rate we are trying to estimate, but it indexes a cluster of users whose conversion rates are assumed to be similar to this user. Subsequently, $\tilde{Y}_{ijk}$ represents the conversion event of all the users in cluster UsrClust$_i$ (hence Binomial) whereas $Y_{ijk}$ represents only the event of user i converting, i.e. Bernoulli event. This kind of user grouping can either be achieved by explicit clustering based on some similarity metric or it can be implicitly done by using data hierarchies, as discussed below.

Data Hierarchies

In the display advertising context user, publisher, and advertiser related data can be considered as adhering to some hierarchical structure. For example, every ad in the DSP can be considered as belonging to an advertising campaign which in turn belongs to an advertiser, e.g. Advertiser: 'Acme Cars'->/Campaign: '2011 Year End Sales'->/Ad: 'Incredible Year End Sales Event!'. Similarly, a Website on which an ad is displayed is under a top level domain (TLD) which is owned by a publisher and the publisher itself might belong to some category based on its main content, e.g. Publisher Type: 'News'->/Publisher: 'New York Times'->/Page: 'Auto News'.

The data hierarchies enable us to define explicit or implicit user clusters. Explicit user clustering, as one might guess, is based on representing each user by a set of features, e.g. demographic information, geographic features, income level, type of Websites they frequently visit, activity level, etc. and clustering them based on some similarity metric, such as Euclidean distance. On the other hand, implicit clustering is based on using data hierarchies rather than the user features. For example, the group of users who visit Websites in a certain category, such as sports, can be considered as an implicit cluster.

We can represent this grouping by the Cartesian product {Users X/Publisher Type}. As another example, we can also consider all the users who were shown an ad from ad-campaign, such as 'Acme Cars Year End Sales,' on a particular site, e.g. Acme Times Autos, which can be represented by the Cartesian product {Users X/Publisher Type X/Campaign}. If we assume that user, publisher, and advertiser data have $l_u, l_p$ and $l_a$ levels in their respective data hierarchies, there are $l_u \times l_p \times l_a$ such possible implicit user clusters. Then, given that adrequest={user: $u_i$, page: $p_j$}, we can identify the suitable explicit and implicit user clusters from the data hierarchies and use past count data, i.e. number of impressions and number of conversions, of each level to get different estimates of:

$$p_{ijk}=p(Y=1|u_i,p_j,a_k) \quad (5).$$

This is explained in more detail below.

Conversion Rate Estimation

The following discussion provides details of our conversion rate (CVR) estimation method. We first revisit data hierarchies and explain how past observations from different levels in the hierarchies yield weak estimators of the desired CVR for a given ad call. Afterwards, we discuss how we can combine these weak estimators using logistic regression to get a more accurate estimator.

Past Performance at Different Hierarchical Levels

Recall from equation (1) that given an request parameterized by {user: $u_i$, page: $p_j$}, we would like to find the ad, $a_k$, which has the highest CVR, $p^*_{ijk}$.

As we explained above, if we can identify a group of users whose CVR is similar to that of user $u_i$'s, then we can make the following approximation:

$$p_{ijk}=p(Y=1|u_i,p_j,a_k) \approx \tilde{p}_{ijk}=p(\tilde{Y}=1|u \in C_{u_i}, p_j, a_k) \quad (6)$$

where $C_{u_i}$ denotes a cluster of users in which $u_i$ belongs. Note that this approximation relies on an explicit user clustering and observes all the users in $C_{u_i}$ who were shown ad $a_k$ when they visited Website $p_j$. Then, the simplest possible estimator for $p_{ijk}$ is given by:

$$\hat{p}_{ijk} = \hat{p}_{ijk}^{MLE} = \begin{cases} \frac{S_{ijk}}{T_{ijk}}, & \text{if } T_{ijk} \neq 0 \\ \text{unknown}, & \text{if } T_{ijk} = 0, \end{cases} \quad (7)$$

This simple estimator has the advantage that if all the users in cluster $C_{u_i}$ have the same CVR and if we have increasingly more observations $T_{ijk}$, $\hat{p}_{ijk}$ converges to the true value $p_{ijk}$ (i.e. estimator is consistent).

The first challenge is to identify a group users who truly have the same or very similar CVRs. This is related to identifying the users' conversion/purchase intentions and inherently a difficult problem as we pointed out earlier. Even if we can find such clusters that are reasonably homogeneous in terms of users' behaviors, and hence their CVRs, the main challenge is to collect enough data at the granularity of ad $a_k$ and Website $p_j$. In other words, we generally do not have enough observations at (ad, Website) level. Mathematically, this means that $T_{ijk}$ is usually slow. Also recall that conversion is a very rare event. Therefore, for a true conversion rate that is on the order of 10.5, we need many impressions, e.g. on the order of millions (see the formulas in E. Bax, A. Kuratti, P. Mcafee, and J. Romero, *Comparing predicted prices in auctions for online advertising*, Int. J. of Industrial Organization, 30:80-88 (2012)) at the (ad, Website) level before we can get a reliable maximum likelihood estimate. This data sparsity problem can be alleviated by going up in the user, publisher, and advertiser data hierarchies because there are certainly more observations at higher levels than there are at lower levels. We can then generalize equation (6) as follows:

$$p_{ijk} \approx \tilde{p}_{ijk}=p(\tilde{Y}=1|u \in C_{u_i}, p \in C_{p_j}, a \in C_{a_k}). \quad (8)$$

In equation (8), $C_{p_j}$ and $C_{a_k}$ define grouping of the Webpages and advertisers, respectively. For example, at level $l_a=l_2$, we group together all ads that belong to the same campaign, and at level $l_p=l_1$ we group together all Webpages of all publishers that are of the same type, e.g. automotive related publishers). Then we can identify the groups at levels $l_u, l_p$ and $l_a$ as $C_{u_i}=\{C_u:$ respectively.

$u_i \in C_u^{l_u}\}, C_{p_j}=\{C_p: p_j \in C_p^{l_p}\}$ and $C_{a_k}=\{C_a: a_k \in C_a^{l_a}\}$ In this compact representation, $C_u^{l_u}$ identifies all the user groups at the level $l_u$-th in the user hierarchy.

$C_p^{l_p}$ and $C_a^{l_a}$ similarly identify the Webpage and ad groupings at the $l_p$-th and $l_a$-th levels.

As we identified above, if the user, publisher, and advertiser data have $l_u, l_p$ and $l_a$ levels in their respective hierarchies, there are $l_u \times l_p \times l_a$ possible ways of combining count data from different levels.

Let $\hat{\tilde{p}}_{ijk}^1, \ldots, \hat{\tilde{p}}_{ijk}^M$ denote maximum likelihood estimates of the CVRs at M different combinations of (user,publisher, advertiser) hierarchical levels. For example, $\tilde{p}_{ijk}^1$ can be $p(Y=1|u \in C_{u_i}^{l_2}, p \in C_{p_j}^{l_3}, a \in C_{a_k}^{l_3},)$ and $\tilde{p}_{ijk}^M$ can be $p(Y=1|u \in C_{u_i}^{l_1}, p \in C_{p_j}^{l_1}, a \in C_{a_k}^{l_1},)$ While going up along the data hierarchies solves the problem of data sparsity, it introduces bias in the CVR estimation. This is not really surprising because grouping together more distinct type of users at higher levels violates the assumption that the users in the same group have similar CVRs. Consequently, many of the M estimators are quite weak in the sense that their CVR values, $\tilde{p}_{ijk}$, are poorly correlated with the true $p_{ijk}$. Therefore, many of these weak estimators are discarded and we use only a select few set of estimators that are highly correlated with the true CVR. Below, we discuss how we can combine these weak estimators to obtain a final estimator that has better predictive performance.

Combining Estimators Using Logistic Regression

Following the notation above, let $\hat{p}_{ijk}^1, \ldots, \hat{p}_{ijk}^M$ denote maximum likelihood estimates of the CVRs of events at M different levels. Recall that each of these levels correspond to a distinct combination of the user, publisher, and advertiser hierarchies and, as such, it is not always clear which one yields the best estimate of the true event CTR, $p_{ijk}$. Rather than trying to pick the best one among all M estimators, we seek to combine these estimators optimally. In other words, we would like to obtain:

$$p_{ijk} = f(\hat{p}_{ijk}^1, \ldots, \hat{p}_{ijk}^M; \beta) \quad (9)$$

for some function $f(\bullet): [0, 1]^M \rightarrow [0, 1]$ which has a set of parameters denoted by $\beta$.

Note that for every impression, the outcome of all M estimators can be computed and logged in a database. Additionally, in the ad-exploration stage, we can serve impressions with different ads and observe whether the impression resulted in a conversion or not. Assume that for a running campaign we collect such training data for N different impressions.

Let $y_s \in \{0, 1\}$ encode the conversion outcome of the s-th impression and $\hat{p}^{s1}, \ldots, \hat{p}^{sM}$ denote the associated maximum value estimates of the CVR value for the same impression, where $s = 1, \ldots, N$. Note that for clarity of presentation we dropped the subscripts i, j, and k and compactly represent the impression by the subscript s. However, it should be clear that every impression is served to a different user on a new website with a different ad and the dependence of the CVR $p^s$ on these data components is always implied. The log-likelihood of this training data can be written as follows:

$$\mathcal{L}(\beta) = \sum_{s=1}^{N} y_s \log p^s(\beta) + (1-y_s)\log(1-p^s(\beta)) \quad (10)$$

$$= \sum_{s=1}^{N} y_s \log f(\hat{p}^{s1}, \ldots, \hat{p}^{sM}; \beta) +$$

$$(1-y_s)\log(1-f(\hat{p}^{s1}, \ldots, \hat{p}^{sM}; \beta))$$

We can use log-likelihood as a goodness-of-fit measure and choose the set of parameters $\beta$ such that they maximize the $L(\beta)$ over the training set. In our system we are using the sigmoid function $$f(x; \beta) = \frac{1}{1+e^{-\beta^T x}}$$

to combine different CVR estimates because it always produces estimates between 0 and 1 and the resulting model can be interpreted easily by comparing their linear combination coefficients. With this choice of $f(\bullet)$, the optimum set of parameters can be found by solving the following optimization problem:

$$\beta^* = \underset{\beta}{\operatorname{argmax}} \mathcal{L}(\beta) \quad (11)$$

$$= \underset{\beta}{\operatorname{argmax}} \sum_{s=1}^{N} y_s [\beta^T \hat{p}^s - \log(1+\beta^T \hat{p}^s)]$$

where $\hat{p}^s = [\hat{p}^{s1} \ \hat{p}^{s2} \ \ldots \ \hat{p}^{sM}]^T$.

Another way to interpret this formulation is to think of the M individual estimators as factors (or features) in a classification model and the optimization process as finding the optimal linear combination coefficients that classify the training data, i.e. the conversion impressions and no conversion impressions, as accurately as possible. However, we should point out that because we are not actually interested in classifying an impression, but rather in estimating its probability of conversion, we only need the probabilistic scores assigned by logistic regression and we never have to select a classification threshold.

To measure how well the estimated $p^s$ values explain the training data, we can compute the data likelihood using the fitted $\beta^*$ as shown in equation (10). We can also measure the performance by treating the logistic regression output as classification scores and computing the area under the receiver operating characteristics curve. We refer to this as the AUC metric. This metric explains how well the logistic regression scores of the conversion and no conversion impressions separate.

Practical Issues in CVR Estimation

In the following section, we discuss several practical issues encountered in implementing the herein disclosed CVR estimation method in our DSP and present our current solutions.

Data Imbalance

When we consider the CVR estimation as a classification problem (see above), we ideally would like to have sufficient amount of training examples from both the conversion and no-conversion event classes. However, typical conversion rates in a display advertising campaign ranges anywhere from $10^{-3}$ to $10^{-6}$. In other words, only 1 out of a million impressions may result in a conversion event on average. Hence, any training data we collect is highly skewed towards the no-conversion class. In the learning context there are different scenarios that might result in skewed training data, but in our problem the two main reasons for having data imbalance can be identified as follows:

1. The average conversion rate of an advertising campaign is inherently very low and we do not get to observe sufficient amount of conversion events.
2. The ratio of the number of no-conversion events to that of conversion events is very large, but we still have reasonable amount of data from the minority, i.e. conversion, class.

In the first scenario, we do not have enough number of representative examples from the minority class and we cannot reliably train a CVR estimation model. Then, we simply use a different manually-crafted, rule-based model that combines the base estimators $\hat{p}^{s1}, \ldots, \hat{p}^{sM}$ and never train a logistic regression model.

In the second case, we are able to train a logistic regression model using the skewed data. Performance of a model when trained on a highly skewed data set has to be carefully analyzed. We use AUC as a metric because it is more robust in imbalanced data scenarios. In our experiments, we observed that data imbalance does not necessarily effect the AUC performance of the logistic regression model as long as we have sufficient amount of examples from the minority class and this observation is also verified by Maloof (see M. A. Maloof, *Learning when data sets are imbalanced and when costs are unequal and unknown*, ICML Workshop on Learning from Imbalanced Datasets II, 2003)). While building a CVR estimation model for a specific campaign, we try to keep all examples from the minority class to ensure sufficient representation, but only a subset of the majority class due to memory constraints.

Output Calibration

For training data collection, we use stratified sampling strategy and only retain a small subset of the examples from the no-conversion class. This strategy results in a training data set where the proportion of the examples from different classes does not match the true data proportions, i.e. the inherent conversion rate for the campaign. Subsequently, the output scores of the logistic regression model optimized on such training data does not represent the actual scale of the CVR values for this advertising campaign. Because the bidding process requires accurate estimates of the CVR values, we need to calibrate the logistic regression output scores to take into account the true proportions of the event classes. The goal of the calibration process can be simply expressed as finding the true CVR value for the s-th impression given the logistic regression score:

$$\hat{p}^s = p(Y^s=1 | f(\hat{p}^s; \beta^*)) \qquad (12)$$

where $f(\hat{p}^s; \beta^*)$ represent the logistic regression score given the M weak $\hat{p}^s$ estimator values and represent the final CVR estimate for this impression after the calibration.

One way of obtaining this mapping from the logistic regression score to the calibrated output is to assume a parametric form for the density in equation (12) and compute its parameters using the training examples. However, this procedure requires some information or intuition about what the true density might look like. Instead, we follow an empirical approach and make the following approximation:

$$\hat{p}^s \approx p(Y^s=1 | v_1 \leq f(\hat{p}^s; \beta^*) < v_2) \qquad (13)$$

for some score values within the range $v_1$ and $v_2$. Specifically, we group the logistic regression output scores into n equal sized bins, where $0 \leq v_1 < v_2 < \ldots, v_{n+1} \leq 1$ define the range of scores in each bin. Then we can approximate the calibration output $\hat{p}^s$ for the i-th bin using the maximum value estimation as follows:

$$\hat{p}(i) \approx p(Y^s=1 | v_i \leq f(\hat{p}^s; \beta^*) < v_{i+1}) \qquad (14)$$

$$\approx \frac{\# \text{ Conversion examples with } f(\hat{p}^s; \beta^*) \in [v_i, v_{i+1})}{\# \text{ All examples with } f(\hat{p}^s; \beta^*) \in [v_i, v_{i+1})}$$

In other words, calibration procedure becomes a simple conversion rate estimation in each score bin. As a result, we obtain the calibrated CVR for every bin $\hat{p}(1), \ldots, \hat{p}(n)$.

In the runtime, when we need to estimate the CVR for a new impression, we first compute the logistic regression score and convert it to the final estimate by:

$$\hat{p}^{Test} \approx p(Y^{Test}=1 | v_i \leq f(\hat{p}^{Test}; \beta^*) < v_{i+1}) \qquad (15)$$
$$= \alpha \hat{p}(v_i) + (1-\alpha)\hat{p}(v_{i+1})$$

assuming the logistic regression score falls within $[v_i, v_{i+1})$, where $$\alpha = \frac{v_{i+1} - f(\hat{p}^{Test}; \beta^*)}{v_{i+1} - v_i}.$$

In practice, even the bin conversion rates, $\hat{p}(v_i)$, may be not accurately estimated in case there is only a small number of observations in a score bin. For this reason we employ some post-processing to smoothen the $\hat{p}(v_i)$ values.

Specifically, we enforce that $\hat{p}(v_i)$'s are monotonically increasing by applying Pool Adjacent Violators Algorithm (PAVA). The whole conversion curve can be further smoothed by fitting an exponential function to it.

Missing Features

Even though we would like to combine all the weak estimator outputs $\hat{p}^1, \ldots, \hat{p}^M$ using logistic regression, some of these values may not be available for certain impressions. For example, if user IDs are not found in the user profile servers, or the publisher's Webpage does not match any of the known categories in the publisher taxonomy, the estimators using these information sources simply can not be computed. Moreover, there may not be sufficient number of conversion events in one of the hierarchical levels to calculate a reliable estimator output using the past performance observations.

Little et al. (R. J. A. Little and D. B. Rubin, *Statistical Analysis with Missing Data*, John Wiley and Sons, 1987)) classify the nature of missing data into missing completely at random (MCAR), missing at random (MAR), and not missing at random (NMAR). For simplicity, we assume that our impression data follows the MAR pattern, meaning that whether some portion of the data is missing or not only depends on the data being observed. Under the MAR assumption, one simple but effective approach widely used in the data mining community to handle missing data is called imputation, which attempts to complete the missing attributes by filling them with specific values.

Here, we present a probabilistic framework for missing value imputation, which subsumes the strategy that we ended up using. Assume that the past performance estimators of a given impression s are partitioned into two groups $\hat{p}^s = [\hat{p}^{so_s}, \hat{p}^{sm_s}]^T$, where $\hat{p}^{so_s}$ and $\hat{p}^{sm_s}$ represent the sub-vectors for the observed and missing past performance estimators, respectively. Furthermore, assume that $\hat{p}^{so_s}$ and $\hat{p}^{sm_s}$ are jointly Gaussian, so that $$\hat{p}^s \sim \mathcal{N}(\mu, \Sigma), \qquad (16)$$
$$\hat{p}^{so_s} \sim \mathcal{N}(\mu_{o_s}, \Sigma_{o_s}),$$
$$\hat{p}^{sm_s} \sim \mathcal{N}(\mu_{m_s}, \Sigma_{m_s})$$

-continued where $\mu = [\mu_{m_s}^T, \mu_{o_s}^T]^T$, and $\Sigma = \begin{pmatrix} \Sigma_{m_s} & \Sigma_{m_s o_s} \\ \Sigma_{m_s o_s}^T & \Sigma_{o_s} \end{pmatrix}$.

One can show that $\hat{p}^{sms}|\hat{p}^{sos}$ is also normally distributed:

$$\hat{p}^{sms}|\hat{p}^{sos} \sim N(\mu_{m_8} + \Sigma_{m_8 o_8}(\Sigma_{o_8})^{-1}(\hat{p}^{sos} - \mu_{o_8}), \Sigma_{m_8} - \Sigma_{m_8 o_8}(\Sigma_{o_8})^{-1}\Sigma_{m_8 o_8}^T). \quad (17)$$

Then, it is easy to see that the optimal estimate of $\hat{p}^{sms}$, in the least squares sense, is the mean of the conditional distribution in equation (17), which we refer to as the Bayesian Least Squares Estimator (BLSE). We can adopt this framework for missing value imputation by replacing the Gaussian parameters in equation (17) with their empirical estimates. Specifically, we can replace $\Sigma$ $\mu$ by its sample mean estimate, and by the sample covariance matrix, which is computed using the pair-wise complete observation scheme. Then, the BLSE-based imputation method estimates the missing attribute values using:

$$\hat{p}_{BLSE}^{sms} = \hat{\mu}_{m_8} + \hat{\Sigma}_{m_8 o_8}(\hat{\Sigma}_{o_8})^{-1}(\hat{p}^{sos} - \hat{\mu}_{o_8}) \quad (18)$$

Other common imputation strategies, such as unconditional mean (or median) imputation, and conditional mean (or median) imputation, can be treated as simple variations or special cases of this probabilistic framework. For example, mean (or median) imputation does not use the second term in equation (18) and simply estimates the missing attribute values using the column wise means (or medians). There are other imputation methods in the literature that are worth mentioning, such as imputation by singular value decomposition (SVD) (see J.-F. Cai, E. J. Candes, and Z. Shen, *A singular value thresholding algorithm for matrix completion*, SIAM J. on Optimization, 20:1956{1982, (2008)), Gaussian mixture modeling (GMM) (see D. Williams, X. Liao, Y. Xue, L. Carin, and B. Krishnapuram, *On classification with incomplete data*, IEEE Trans. On Pattern Analysis And Machine Intelligence, 29, 2007)), and Collaborative Filtering (see B. M. Marlin and R. S. Zemel, *Collaborative prediction and ranking with non-random missing data*, 3rd ACM Conf. on Recommender Systems, 2009)). However, those approaches come with the cost of increased computational complexity with little or no effect on the final CVR estimation.

Feature Selection

The final practical step is a simple feature selection step. Considering the past performance estimators $\hat{p}^1, \ldots, \hat{p}^M$ as features for the logistic regression algorithm, we first analyze the data to observe its attribute statistics. If many of the training examples have a certain attribute missing, we do not want to impute that attribute from a very limited set of examples as it results in a poor model fit with a poor predictive performance. In our modeling approach, we discard such attributes if more than 65% of the training examples have that particular attribute missing. Finally, we discard those attributes whose variance is below a certain threshold. We set that threshold to $10^{-8}$. After these simple preprocessing steps, we impute the remaining attributes' missing values and use the resulting data for model fitting.

Computer Implementation

Figure 2:
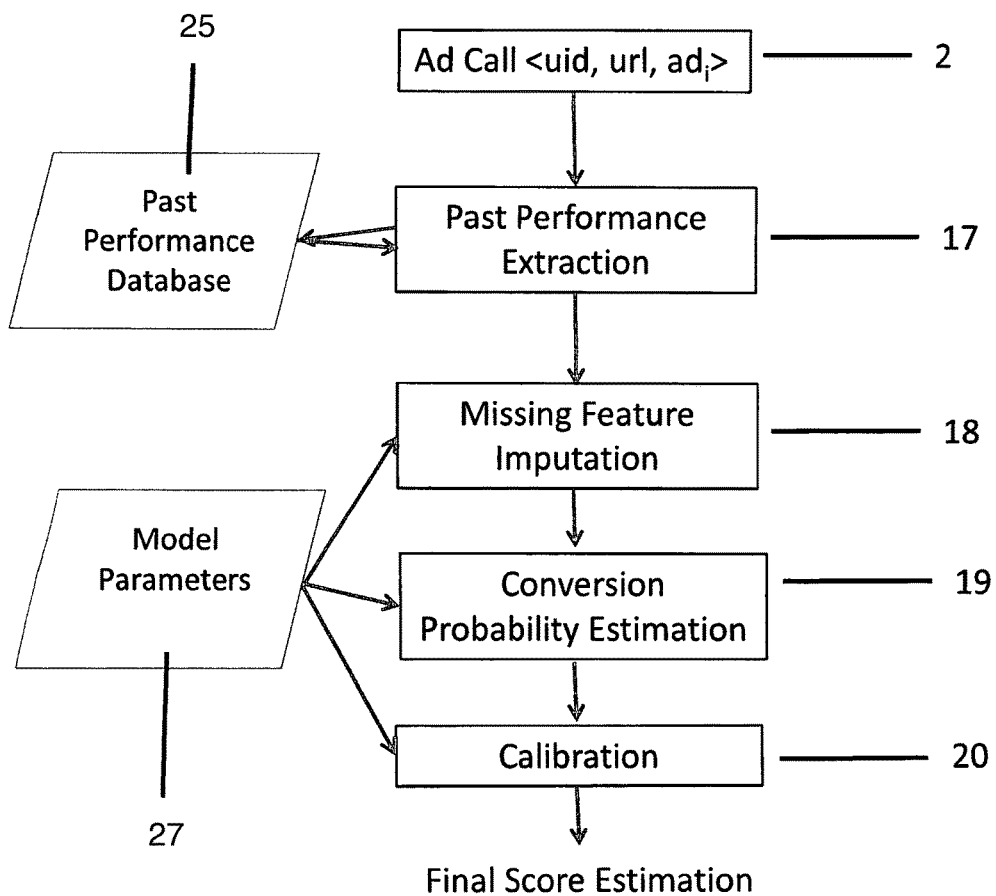
FIG. 2 is a block schematic diagram that shows the internal handling of an ad call by the decision engine according to the invention.

FIG. 2 illustrates an online decision engine 12 of the DSP 7 that is configured in accordance with one or more embodiments of the invention. An online decision engine, such as shown and described may implement, for example, the past performance feature extraction 17, missing feature imputation 18, conversion probability estimation 19, calibration process 20, to score each incoming ad request. The system may execute portions of any equations described herein through use of modules or components.

Figure 3:
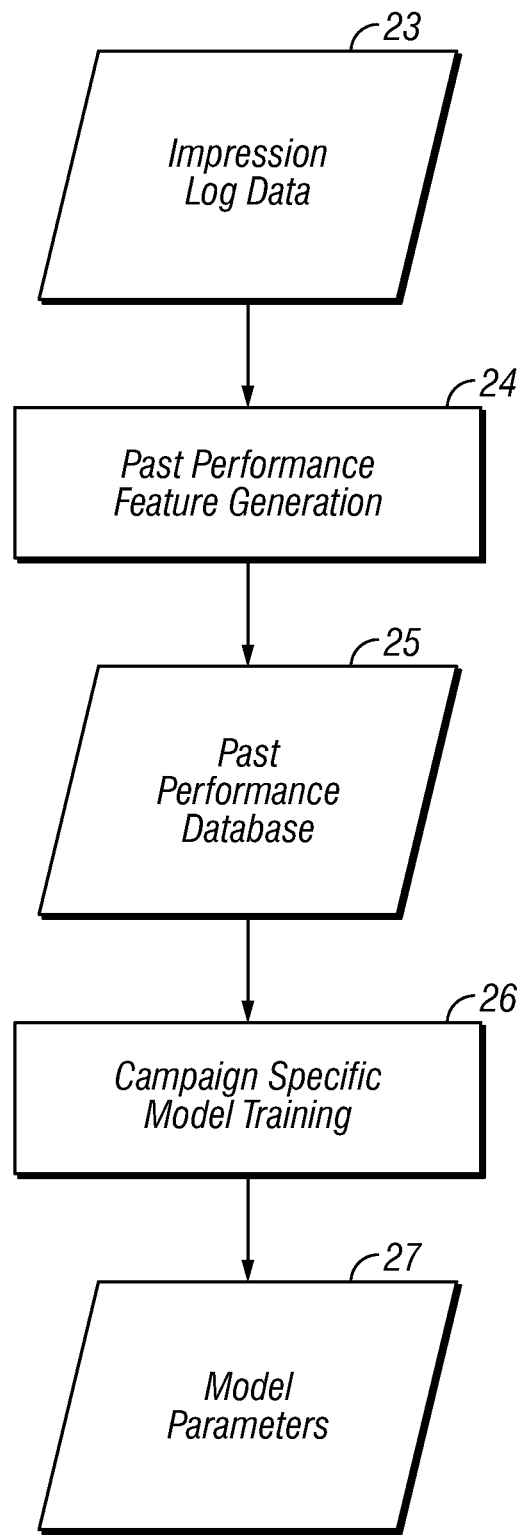
FIG. 3 is a block schematic diagram that shows the internal handling of the offline campaign specific training process according to the invention.

FIG. 3 illustrates an offline training process that is configured in accordance with one or more embodiments of the invention. An offline training process such as shown and described may implement, for example, the past performance feature generation 24 based on the impression log data 23, and campaign specific model training 26, to produce a past performance database 25 and model parameters 27 later on for use by a decision engine 12 to perform ad scoring.

In an embodiment, the offline training procedure uses a map-reduce architecture to scale simultaneous and active model training for a very large number of campaigns.

Figure 4A:
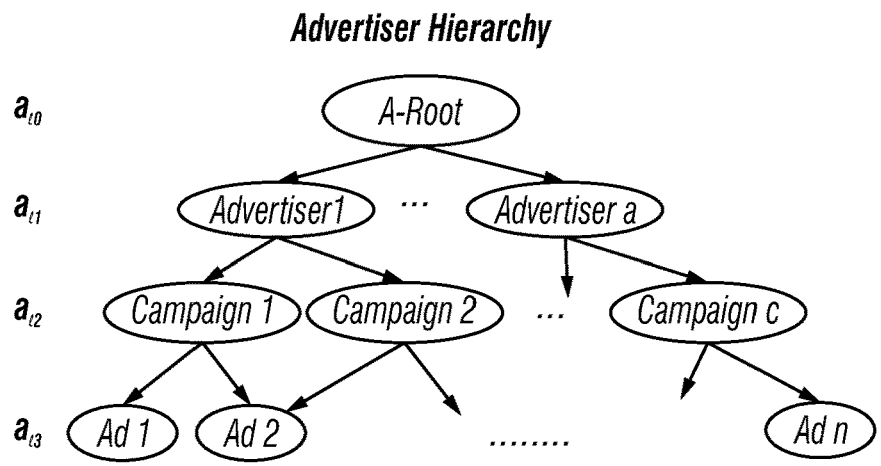
FIGS. 4A-4C illustrate an implementation of data hierarchies in selected feature sets.
Figure 4B:
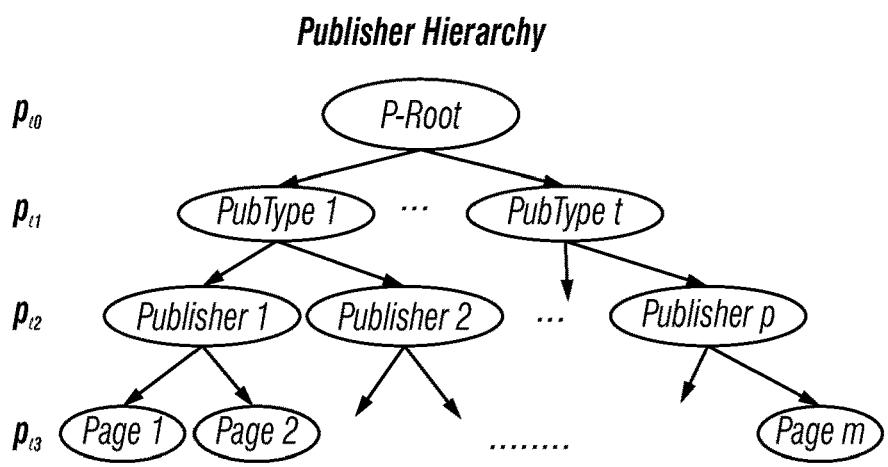
Figure 4C:
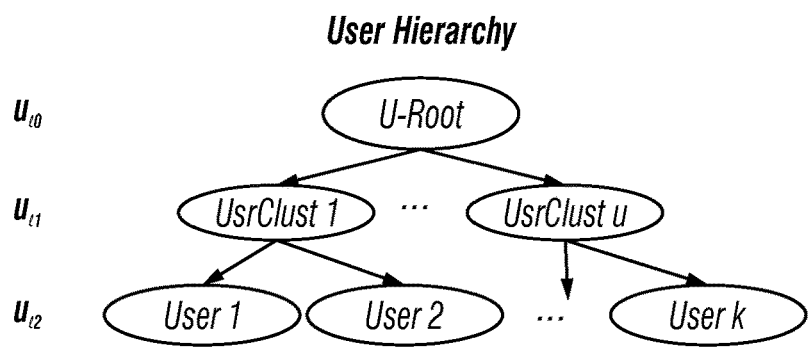

FIG. 4A-4C illustrate an implementation of data hierarchies in selected feature sets. In one embodiment, the hierarchical structure can be represented by advertiser (FIG. 4A), publisher (FIG. 4B), and user taxonomy (FIG. 4C). The subscript li designates the i-th level in each component's data hierarchy according to the invention. In another embodiment, the third party information, geographical information, and temporal information, can also be easily incorporated into the data hierarchies described in the invention.

Figure 5:
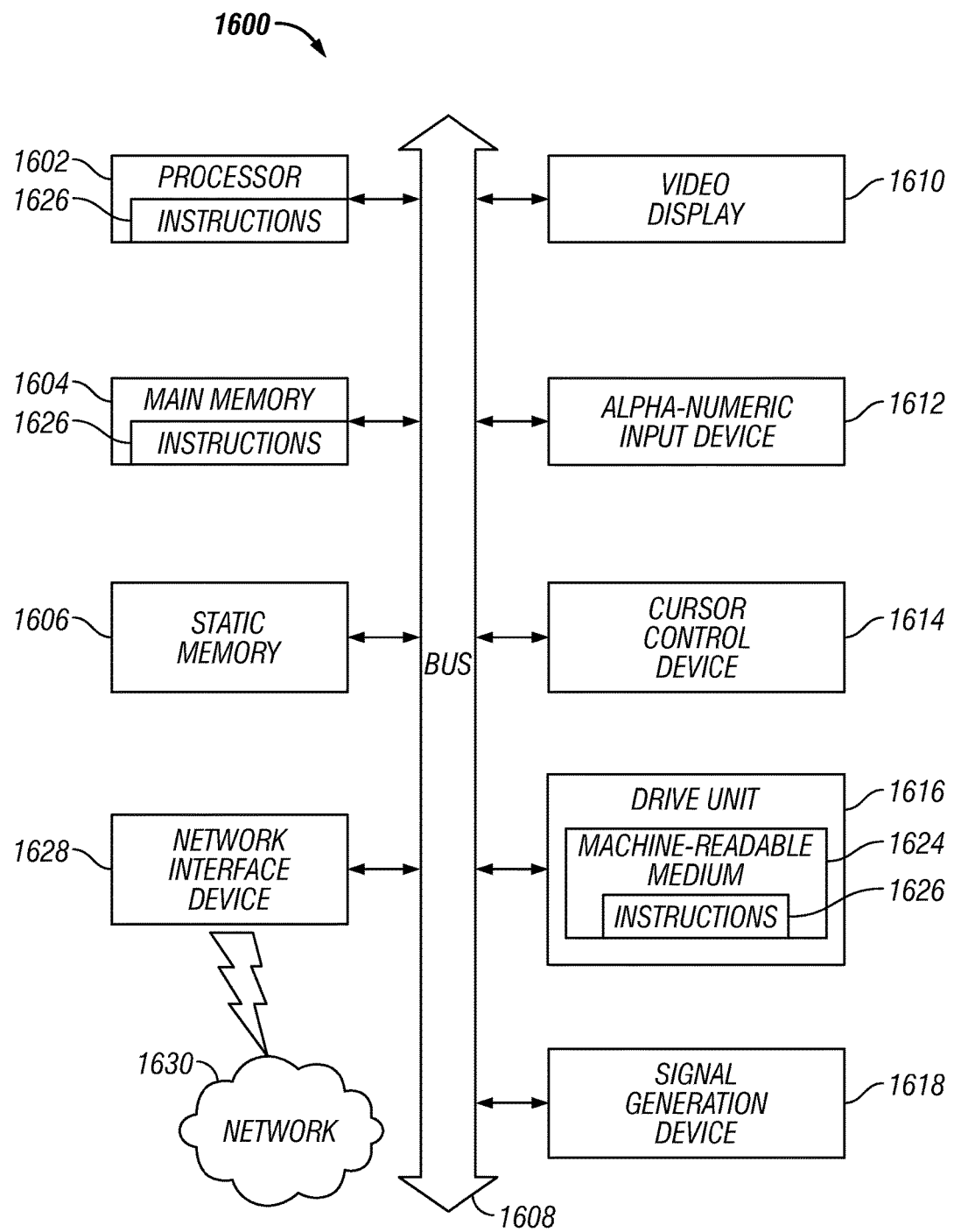
FIG. 5 is a block schematic diagram of a machine in the exemplary form of a computer system within which a set of instructions for causing the machine to perform any of the herein disclosed methodologies may be executed.

FIG. 5 is a block schematic diagram of a machine in the exemplary form of a computer system 1600 within which a set of instructions for causing the machine to perform any of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method comprising:
receiving an advertising opportunity call at a real-time bid exchange server of an advertising campaign management system, wherein the advertising opportunity call is generated in response to a request to access a webpage at a web browser application on a client machine;
generating, via the real-time bid exchange server, an advertising opportunity bid request for the advertising opportunity call, the adverting opportunity bid request providing the opportunity to place a bid to transmit an advertisement for presentation at the client machine,
appending, via the real-time bid exchange server, an address of the webpage and a user profile associated with the client machine to the advertising opportunity bid request;
transmitting, via the real-time bid exchange server, the advertising opportunity bid request to a demand side platform of the advertising campaign management system;
transmitting, via a data management platform of the advertising campaign management system, user data and webpage data to the demand side platform;
predicting, via a decision engine of the demand side platform, the likelihood of a conversion event for the advertising opportunity for each of a plurality of advertisements being presented with respect to data hierarchies including one or more of the following:
a user cluster of a plurality of users that include a user corresponding to the user profile specified in the bid request,
a publisher cluster of a plurality of publishers having a same type as a publisher specified by the bid request, and
an advertiser cluster of a plurality of advertisements of a campaign or advertiser to which such each advertisement belongs,
wherein predicting the likelihood of the conversion event for each advertisement is based on a probabilistic distribution based on historical data of conversion events for a plurality of advertisements that were served for all of the users belonging to the user cluster, all of the publishers belonging to the publisher cluster, and all of the advertisements belonging to the advertiser cluster;
for each advertisement of the plurality of advertisements with a predicted likelihood of a conversion event that exceeds a predetermined threshold, transmitting, from the decision engine, an indication of the particular advertisement and an associated bid value amount for such particular advertisement to the real-time bid exchange;
collecting one or more indications and associated bid value amounts at the real-time bid exchange and determining a winning indication corresponding to an advertisement with the highest associated bid value amount;
transmitting the location of an ad creative file to the web browser, wherein the ad creative file is located on a host server and corresponds to the advertisement corresponding to the winning indication; and
retrieving, via the web browser, the ad creative file and rendering the corresponding advertisement on the webpage at the client machine.

2. The method recited in claim 1, wherein each of the respective probabalistic distributions comprises a binomial distribution, and where the likelihood of a conversion event is predicted using a maximum likelihood estimator.

3. The method recited in claim 1, the method further comprising:
calibrating the estimated likelihood of the conversion events with a plurality of actual conversion rate values.

4. The method recited in claim 1, wherein the user cluster, publisher cluster, and advertiser cluster are selected from a plurality of user clusters that each include the user, publisher clusters of the same type as the publisher, and/or advertiser clusters to which the advertisement for which the likelihood is being predicted belongs, respectively using a logistic regression.

5. The method of claim 4, wherein the user cluster, publisher cluster, and advertiser cluster are each formed by combining the respective plurality of user, publisher, and advertiser clusters using a function having a plurality of parameters that are selected to result in a maximized fit between output scores from the function and actual conversion rates for a set of training data and so that the output scores serve to separate conversion and no conversion data.

6. A demand-side platform advertising campaign management system comprising:
a real-time bid exchange server configured to:
receive an advertising opportunity call generated in response to a request to access a webpage at a web browser application on a client machine,
generate an advertising opportunity bid request for the advertising opportunity call, the adverting opportunity bid request providing the opportunity to place a bid to transmit an advertisement for presentation at the client machine, and
append an address of the webpage and a user profile associated with the client machine to the advertising opportunity bid request;
a demand side platform configured to receive the advertising opportunity bid request, the advertising opportunity bid request being transmitted by the real-time bid exchange server;
a decision engine of the demand side platform, wherein the decision engine is operable to:
predict the likelihood of a conversion event for the advertising opportunity for each of a plurality of advertisements being presented with respect to data hierarchies including one or more of the following:
- a user cluster of a plurality of users that include a user corresponding to the user profile specified in the bid request,
- a publisher cluster of a plurality of publishers having a same type as a publisher specified by the bid request, and
- an advertiser cluster of a plurality of advertisements of a campaign or advertiser to which such each advertisement belongs,
- wherein predicting the likelihood of the conversion event for each advertisement is based on a probabilistic distribution based on historical data of conversion events for a plurality of advertisements that were served for all of the users belonging to the user cluster, all of the publishers belonging to the publisher cluster, and all of the advertisements belonging to the advertiser cluster;
- for each advertisement of the plurality of advertisements with a predicted likelihood of a conversion event that exceeds a predetermined threshold, the decision engine, transmit an indication of the particular advertisement and an associated bid value amount for such particular advertisement to the real-time bid exchange;

wherein the real-time bid exchange is further configured to:
- collect one or more indications and associated bid value amounts,
- determine a winning indication corresponding to an advertisement with the highest associated bid value amount, and
- transmit the location of an ad creative file to the web browser, wherein the ad creative file is located on a host server and corresponds to the advertisement corresponding to the winning indication;
- wherein the ad creative file is retrieved by the web browser and the corresponding advertisement is rendered on the webpage at the client machine.

7. The system recited in claim 6, wherein each of the respective probabalistic distributions comprises a binomial distribution, and where the likelihood of a conversion event is predicted using a maximum likelihood estimator.

8. The system recited in claim 6, wherein the processor is further operable to:
calibrate the estimated likelihood of the conversion events with a plurality of actual conversion rate values.

9. The system recited in claim 6, wherein the user cluster, publisher cluster, and advertiser cluster are selected from a plurality of user clusters that each include the user, publisher clusters of the same type as the publisher, and/or advertiser clusters to which the advertisement for which the likelihood is being predicted belongs, respectively using a logistic regression.

10. The system of claim 6, wherein the user cluster, publisher cluster, and advertiser cluster are each formed by combining the respective plurality of user, publisher, and advertiser clusters using a function having a plurality of parameters that are selected to result in a maximized fit between output scores from the function and actual conversion rates for a set of training data and so that the output scores serve to separate conversion and no conversion data.

11. One or more non-transitory computer readable media having instructions stored thereon for performing a method, the method comprising:
receiving an advertising opportunity call at a real-time bid exchange server of an advertising campaign management system, wherein the advertising opportunity call is generated in response to a request to access a webpage at a web browser application on a client machine;
generating, via the real-time bid exchange server, an advertising opportunity bid request for the advertising opportunity call, the adverting opportunity bid request providing the opportunity to place a bid to transmit an advertisement for presentation at the client machine,
appending, via the real-time bid exchange server, an address of the webpage and a user profile associated with the client machine to the advertising opportunity bid request;
transmitting, via the real-time bid exchange server, the advertising opportunity bid request to a demand side platform of the advertising campaign management system;
transmitting, via a data management platform of the advertising campaign management system, user data and webpage data to the demand side platform;
predicting, via a decision engine of the demand side platform, the likelihood of a conversion event for the advertising opportunity for each of a plurality of advertisements being presented with respect to data hierarchies including one or more of the following:
- a user cluster of a plurality of users that include a user corresponding to the user profile specified in the bid request,
- a publisher cluster of a plurality of publishers having a same type as a publisher specified by the bid request, and
- an advertiser cluster of a plurality of advertisements of a campaign or advertiser to which such each advertisement belongs,
- wherein predicting the likelihood of the conversion event for each advertisement is based on a probabilistic distribution based on historical data of conversion events for a plurality of advertisements that were served for all of the users belonging to the user cluster, all of the publishers belonging to the publisher cluster, and all of the advertisements belonging to the advertiser cluster;
for each advertisement of the plurality of advertisements with a predicted likelihood of a conversion event that exceeds a predetermined threshold, transmitting, from the decision engine, an indication of the particular advertisement and an associated bid value amount for such particular advertisement to the real-time bid exchange;
collecting one or more indications and associated bid value amounts at the real-time bid exchange and determining a winning indication corresponding to an advertisement with the highest associated bid value amount;
transmitting the location of an ad creative file to the web browser, wherein the ad creative file is located on a host server and corresponds to the advertisement corresponding to the winning indication; and
retrieving, via the web browser, the ad creative file and rendering the corresponding advertisement on the webpage at the client machine.

12. The one or more non-transitory computer readable media recited in claim 11, wherein each of the respective probabalistic distributions comprises a binomial distribution, and where the likelihood of a conversion event is predicted using a maximum likelihood estimator.

13. The one or more non-transitory computer readable media recited in claim 11, the method further comprising:
   calibrating the estimated likelihood of the conversion events with a plurality of actual conversion rate values.

14. The one or more non-transitory computer readable media recited in claim 11, wherein the user cluster, publisher cluster, and advertiser cluster are selected from a plurality of user clusters that each include the user, publisher clusters of the same type as the publisher, and/or advertiser clusters to which the advertisement for which the likelihood is being predicted belongs, respectively using a logistic regression.

15. The method of claim 5, wherein a range of output scores from the function are divided into a plurality of equal sized bins that each have a calibration value that is applied to such bin's score based on the actual conversion rates.

16. The system of claim 10, wherein a range of output scores from the function are divided into a plurality of equal sized bins that each have a calibration value that is applied to such bin's score based on the actual conversion rates.

* * * * *